(12) United States Patent
Nakasima et al.

(10) Patent No.: US 6,459,464 B1
(45) Date of Patent: Oct. 1, 2002

(54) LIQUID CRYSTAL DISPLAY DEVICE WITH REDUCED WEIGHTING TRACE DEFECTS

(75) Inventors: Ken Nakasima; Kazuhiro Kobayashi, both of Kumamoto (JP)

(73) Assignee: Kabushiki Kaisha Advanced Display, Kumamoto (JP)

(*) Notice: Subject to any disclaimer, the term of this patent is extended or adjusted under 35 U.S.C. 154(b) by 22 days.

(21) Appl. No.: 09/637,170

(22) Filed: Aug. 14, 2000

(51) Int. Cl.$^7$ .................. G02F 1/136; G02F 1/1343
(52) U.S. Cl. .................. 349/141; 349/43; 349/148
(58) Field of Search .................. 349/141, 148, 349/43

(56) References Cited

U.S. PATENT DOCUMENTS

| | | | | |
|---|---|---|---|---|
| 6,078,375 A | * | 6/2000 | Matsumoto et al. | 349/141 |
| 6,259,503 B1 | * | 7/2001 | Watanabe et al. | 349/141 |

FOREIGN PATENT DOCUMENTS

| | | | | |
|---|---|---|---|---|
| JP | 5241159 | | 9/1993 | |
| JP | 7191336 | | 7/1995 | |
| JP | 8-254712 | | 10/1996 | |
| JP | 9105908 | | 4/1997 | |
| JP | 9171175 | | 6/1997 | |
| JP | 9258269 | | 10/1997 | |
| JP | 10026767 | | 1/1998 | |
| JP | 10090682 | | 4/1998 | |
| JP | 411352491 A | * | 12/1999 | |
| JP | 2000056320 | | 2/2000 | |
| JP | 02000056320 A | * | 2/2000 | |
| JP | 2000056336 | | 2/2000 | |
| JP | 2000066222 | | 3/2000 | |
| JP | 2000122080 | | 4/2000 | |
| JP | 02001033799 A | * | 2/2001 | |

* cited by examiner

Primary Examiner—William L. Sikes
Assistant Examiner—Julie Ngo
(74) Attorney, Agent, or Firm—McDermott, Will & Emery

(57) ABSTRACT

A liquid crystal display device including a pair of substrates so disposed in the spaced-apart relation as to oppose each other with a predetermined distance between them; a liquid crystal layer sandwiched between the substrates; a plurality of scanning signal lines and a plurality of video signal lines so formed on one of the substrates as to cross one another; thin film transistors each being disposed at the point of intersection between the scanning signal line and the video signal line; a comb-like pixel electrode comprising a plurality of electrodes each connected to the thin film transistor and disposed in parallel with the video signal line; and a comb-like counter electrode comprising a plurality of electrodes disposed alternately and in parallel with a plurality of electrodes of the pixel electrode; the liquid crystal display device applying a voltage between the pixel electrode and the counter electrode to thereby apply an electric field substantially in parallel with the substrate surface to the liquid crystal layer, wherein: a bent portion bent in a direction opposite to an orientation direction of the liquid crystal with respect to the video signal line is disposed at the distal end portion of at least one of the pixel electrode and the counter electrode.

16 Claims, 17 Drawing Sheets

LIQUID CRYSTAL DISPLAY DEVICE WITH REDUCED WEIGHTING TRACE DEFECTS

BACKGROUND OF THE INVENTION

1. Field of the Invention

This invention relates to a transverse direction electric field system active matrix liquid crystal display device. More particularly, this invention relates to a technology that will reduce the defect called "weighting trace" that develops when a weight or a load is applied to the display surface, and that can be recognized for a long time even after the removal of weighting.

2. Description of the Related Art

In an active matrix liquid crystal display device described in Japanese Patent Laid-Open No. Hei 8-254712, for example, a transverse electric field system that sets the direction of the electric field applied to a liquid crystal to a direction in parallel with substrates has been used mainly as means for acquiring a ultra-wide visual field angle. It has been clarified that this system substantially eliminates the change of contrast and inversion of a gradation level when the visual field angle is changed (refer to M. Oh-e et al. "Asia Display", 1995, pp.577–580).

FIG. 10 of the accompanying drawings is a plan view showing a pixel portion of an ordinary transverse direction electric field system liquid crystal display device according to the prior art. In the drawing, reference numeral 2 denotes a gate wire as a plurality of scanning signal lines formed on an insulating substrate. The gate wire 2 crosses a source wire 12 as a plurality of video signal lines. Reference numeral 4 denotes a holding capacitance common wire. Reference numeral 6 denotes a semiconductor film of a thin film transistor disposed at each point of intersection between the gate wire 2 and the source wire 12. Reference numeral 9 denotes a holding capacitance electrode disposed over the holding capacitance common wire 4 through a gate insulating film. Reference numeral 10 denotes a comb-like pixel electrode comprising a plurality of electrodes each connected to the thin film transistor and that are disposed in parallel with the source wire 12. Reference numeral 11 denotes a comb-like opposed electrode comprising a plurality of electrodes that are disposed alternately and in parallel with a plurality of electrodes of the pixel electrode 10. Reference numeral 14 denotes a drain electrode and reference numeral 16 denotes a contact hole.

Such a transverse direction electric field system liquid crystal display device involves the problem of a so-called "weighting trace". Namely, when a weight or a load is applied to the display surface, a display defect occurs round the weighted portion due to an abnormal orientation of the liquid crystal, and this display defect can be recognized for a long time even after the removal of the weight or the load. The principle of the occurrence of the weighting trace will be explained with reference to FIGS. 11 to 14. In FIGS. 11 to 14, the angle θ1 is a angle between the direction Ds of source line and the orientation direction D1 of the liquid crystal. FIG. 11 shows the state where no voltage is applied to the liquid crystal and FIG. 12 shows the state where a voltage is applied to the liquid crystal. FIG. 13 shows the state where a voltage is applied to the liquid crystal and moreover, weighting is applied, too, and FIG. 14 shows the orientation of the liquid crystal molecules when the voltage is applied to the liquid crystal and after weighting is removed. When the voltage is not applied to the liquid crystal, the liquid crystal molecules are aligned in the orientation direction determined by the liquid crystal orientation method such as rubbing as shown in FIG. 11. When the voltage is applied to the liquid crystal, the liquid crystal molecules are oriented in the direction of the electric field. At this time, the direction of the electric field changes at the end portions of the pixel electrode 10 and at the end portions of the counter electrode 11 as shown in FIG. 12. Inconsequence, regions develop in which the liquid crystal rotates in the reverse direction, inviting orientation defect regions 22 at the boundaries with the regions in which the liquid crystal rotates in the normal direction. This orientation defect region occurs only in the proximity of the electrode end portions under the voltage application state and the steady state, and can hardly be recognized, in consequence. When weighting is applied to the display surface under the voltage application state, however, the orientation defect region 22 at each end portion of the pixel electrode 10 and the orientation defect region 22 at each end portion of the counter electrode 11 expand as shown in FIG. 13, and these orientation defect regions 22 can be recognized. Majority of these orientation defect regions 22 return to the initial state after weighting is removed, but a part of them remains for a long time, can be recognized and remarkably lowers display quality as shown in FIG. 14.

FIGS. 11 to 14 illustrate the case where the orientation direction of the liquid crystal is counter-clockwise to the source wire 12. FIGS. 15 to 17 show the case where the orientation direction of the liquid crystal is clockwise to the source wire 12. In FIGS. 15 to 17, the angle θ1' is a angle between the direction Ds of source line and the orientation direction D2 of the liquid crystal in this case. FIG. 15 shows the state where the voltage is applied to the liquid crystal. FIG. 16 shows the state where the voltage is applied to the liquid crystal and moreover, weighting is applied, too. FIG. 17 shows the orientation of the liquid crystal molecules under the state where the voltage is applied to the liquid crystal and weighting is removed. In this way, the occurring positions of the abnormal orientation regions 22 in the case where the orientation direction of the liquid crystal is clockwise with respect to the source wire 12 have symmetry of line with the occurring position of the abnormal orientation regions 22 when the orientation direction of the liquid crystal is counter-clockwise, and with respect to the source line 12.

Means that increases the rubbing angle is generally known as a method of reducing the weighting trace described above. In the transverse direction electric field system, however, the visual field angle direction in which the contrast is high is the rubbing angle direction, that is, the orientation direction of the liquid crystal, and the direction orthogonal to the former. Therefore, the problem arises afresh that when the rubbing angle is increased, the visual field angle characteristics of the display device in vertical and transverse directions drop. Because a driving voltage becomes greater with the increase of the rubbing angle, another problem develops further in that low voltage driving becomes difficult.

SUMMARY OF THE INVENTION

To solve the problems described above, the present invention is directed to provide a transverse direction electric field system liquid crystal display device that can reduce the display defect called "weighting trace", in which a display defect occurring due to weighting to the display surface is recognized for a long time even after the removal of weighting, has a wide visual field angle and excellent display characteristics, and can be produced easily and economically.

According to one aspect of the present invention, there is provided a liquid crystal display device including a pair of substrates so disposed in the spaced-apart relation as to oppose each other with a predetermined distance between them; a liquid crystal layer sandwiched between the substrates; a plurality of scanning signal lines and a plurality of video signal lines so formed on one of the substrates as to cross one another; thin film transistors each being disposed at the point of intersection between the scanning signal line and the video signal line; a comb-like pixel electrode comprising a plurality of electrodes each connected to the thin film transistor and disposed in parallel with the video signal line; and a comb-like counter electrode comprising a plurality of electrodes disposed alternately and in parallel with a plurality of electrodes of the pixel electrode; the liquid crystal display device applying a voltage between the pixel electrode and the counter electrode to thereby apply an electric field substantially in parallel with the substrate surface to the liquid crystal layer, wherein: a bent portion bent in a direction opposite to an orientation direction of the liquid crystal with respect to the video signal line is disposed at the distal end portion of at least one of the pixel electrode and the counter electrode.

The bent portion is disposed at the distal end portion of the comb-like pixel electrode.

The opposed electrode has a projection portion protruding in the same direction and at the same angle as the bent portion at a position thereof adjacent to the bent portion formed at the distal end portion of the pixel electrode.

Recess portions of a plurality of comb-like electrodes of the counter electrode are bent in parallel with the bent portions formed at the distal end portions of the adjacent pixel electrodes.

The bent portion is formed at the distal end portion of each comb-like counter electrode.

The pixel electrode has a projection portion protruding in the same direction and at the same angle as the bent portion at a position thereof adjacent to the bent portion formed at the distal end portion of the counter electrode.

Recess portions of a plurality of comb-like electrodes of the pixel electrode are bent in parallel with the bent portions formed at the distal end portions of the adjacent counter electrodes.

According to another aspect of the present invention, there is provided a liquid crystal display device including a pair of substrates so disposed in the spaced-apart relation as to oppose each other with a predetermined distance between them; a liquid crystal layer sandwiched between the substrates; a plurality of scanning signal lines and a plurality of video signal lines so formed on one of the substrates as to cross one another; thin film transistors each being disposed at the point of intersection between the scanning signal line and the video signal line; a comb-like pixel electrode comprising a plurality of electrodes connected to the thin film transistors and disposed in parallel with the video signal line; a comb-like counter electrode comprising a plurality of electrodes disposed alternately and in parallel with a plurality of electrodes of the pixel electrode; the liquid crystal display device applying a voltage between the pixel electrode and the counter electrode to thereby apply an electric field substantially in parallel with the substrate surface to the liquid crystal layer, wherein: conductors having a pattern shape such that at least one of the sides thereof is inclined in a direction opposite to an orientation direction of the liquid crystal with respect to the video signal line are disposed at the distal end portions of at least one of the pixel electrode and the counter electrode, through an insulating film.

The conductors are electrically connected to the pixel electrode or the counter electrode through a contact hole.

The conductor comprises a conductor film having light transmissibility.

DESCRIPTION OF THE PREFERRED EMBODIMENTS

Embodiment 1

Figure 1:
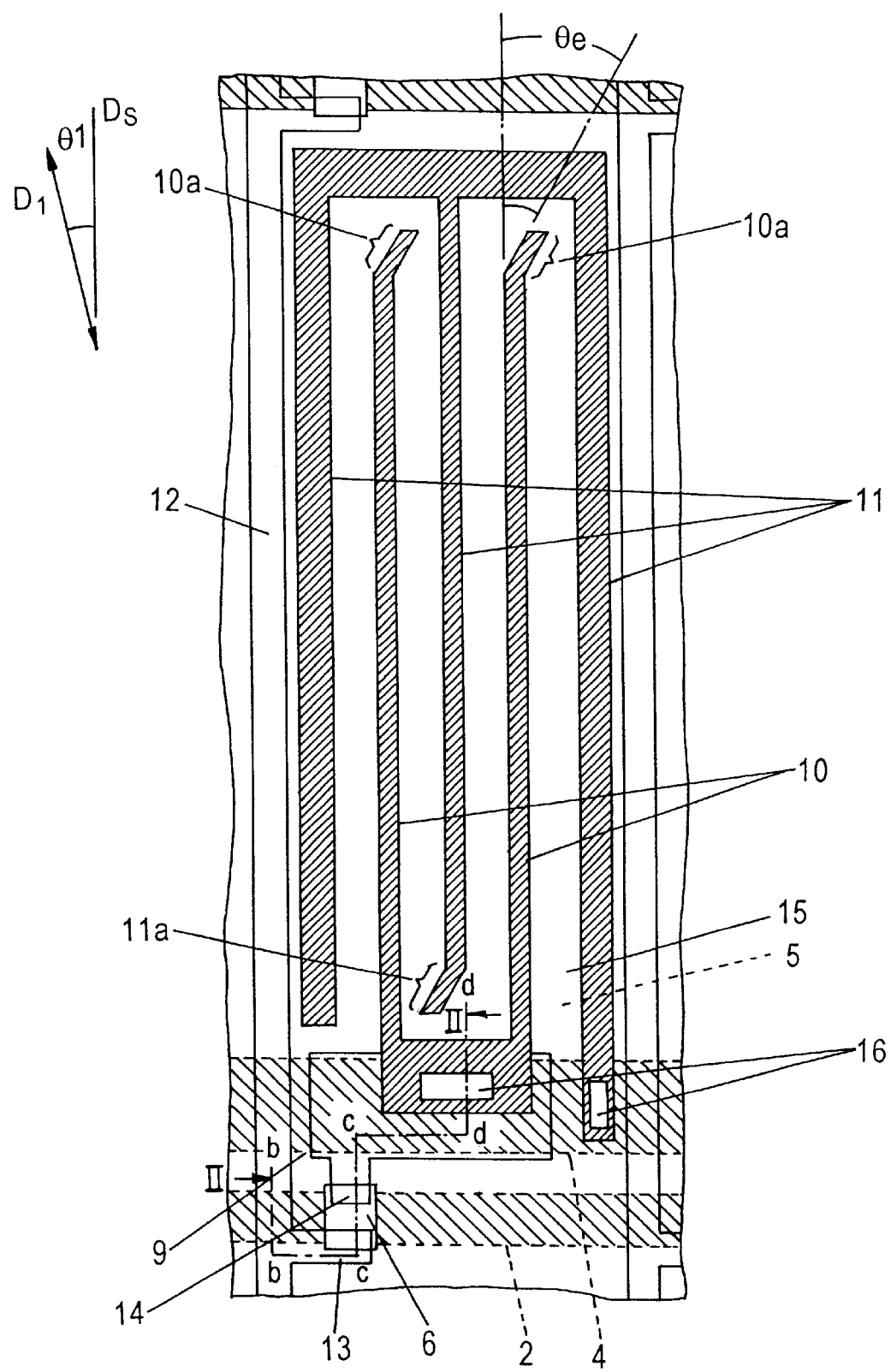
FIG. 1 is a plan view showing a pixel portion of a liquid crystal display device according to the first embodiment of the present invention.

Hereinafter, preferred embodiments of the present invention will be explained with reference to the accompanying drawings. FIG. 1 is a plan view showing a pixel portion of a transverse direction electric field system liquid crystal display device according to the first embodiment of the present invention, and FIG. 2 is a sectional view along sectional line II-II of FIG. 1 showing a production method of the liquid crystal display device shown in FIG. 1.

In the drawings, reference numeral 1 denotes an insulating substrate such as a glass substrate. Reference numeral 2 denotes a gate wire as a plurality of scanning signal lines made of a metal such as Cr, and formed on the insulating substrate 1. The gate wire 2 crosses mutually a source wire 12 as a plurality of video signal lines. Reference numeral 3 denotes a gate electrode made of a metal such as Cr and reference numeral 4 denotes a holding capacitance common wire made of a metal such as Cr. Reference numeral 5 denotes a gate insulating film made of silicon nitride, or the like, and so formed as to cover the gate wire 2 and the holding capacitance common wire 4. Reference numeral 6 denotes a semiconductor film made of non-doped amorphous silicon, or the like, disposed at each point of intersection between the gate wire 2 and the source wire 12 and forming a thin film transistor. Reference numeral 7 denotes a contact film that is formed by doping an impurity such as P into a semiconductor film of Si, or the like. The contact film 7 is connected to the semiconductor film 6 and has a region 8 that is formed by etching away the upper part of an active region as a part of itself. Reference numeral 9 denotes a holding capacitance electrode disposed on the holding capacitance common wire 4 through the gate insulating film 5. Reference numeral 10 denotes a comb-like pixel electrode comprising a plurality of electrodes. The comb-like pixel electrode 10 is made of a metal such as Cr or a transparent conductor film such as ITO (Indium Tin Oxide), is connected to the thin film transistors, and is disposed in parallel with the source wires 12. Reference numeral 11 denotes a comb-like counter electrode comprising a plurality of electrodes that are disposed alternately and in parallel with a plurality of electrodes of the pixel electrode 10. Reference numerals 10a and 11a denote bent portions that are formed at the distal end portions of the pixel electrodes 10 and the counter electrodes 11 and are bent in a direction opposite to the orientation direction D1, D2 of the liquid crystal with respect to the source wires 12 orientation direction Ds. Reference numeral 13 denotes a source electrode formed in such a fashion as to come into contact with the contact film 7 and connected to the source wire 12. Reference numeral 14 denotes a drain electrode so formed as to come into contact with the contact film 7. Reference numeral 15 denotes an inter-level insulating film made of silicon nitride, or the like, and so formed as to cover the device as a whole. Reference numeral 16 denotes a contact hole. Reference numeral 17 denotes a first wire made of the same material as that of the gate wire 2 and formed on the insulating substrate 1. Reference numeral 18 denotes a second wire made of the same material as that of the source wire 12, and formed on the insulating substrate 1. Reference numeral 19 denotes a third wire made of the same material as that of the pixel electrode 10 and connecting the first wire 17 to the second wire 18 through the contact hole.

The liquid crystal display device in this embodiment comprises a pair of substrate arranged in such a fashion as to oppose each other and to secure a predetermined distance between them, a liquid crystal layer sandwiched between these substrates, the comb-like pixel electrode 10 comprising a plurality of electrode and disposed on one of the substrates in parallel with the source wire 12, and the comb-like counter electrode 11 comprising a plurality of electrodes and disposed alternately and in parallel with a plurality of electrodes of the pixel electrode 10. This liquid crystal display device is of a transverse direction electric field system that applies a voltage between the pixel electrode 10 and the counter electrode 11 and applies an electric field substantially parallel to the substrate surface to the liquid crystal layer. The bent portions 10a, 11a are bent in the direction opposite to the orientation direction D1 of the liquid crystal with respect to the source wire 12 orientation direction Ds, and are provided to the distal end portions of at least one of these electrodes 10 and 11 (at the distal end portions of both of them in this embodiment).

Figure 2A:
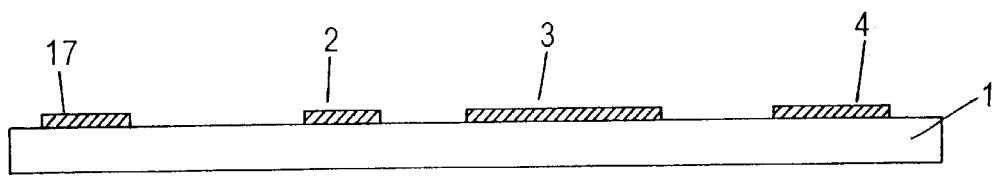
FIG. 2 is a sectional view showing a production method of the liquid crystal display device according to the first embodiment of the present invention.
Figure 2B:
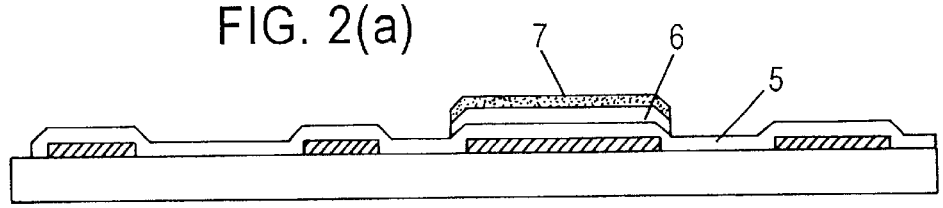

A process flow of the liquid crystal display device according to this embodiment will be explained with reference to FIG. 2. In FIG. 2, the area A shows a conversion portion, the area B shows a gate/source intersection portion, the area C shows a TFT portion, and the area D shows a auxiliary capacitance portion. First, as shown in FIG. 2(a), a conductor film is formed on an insulating substrate 1 by a metal such as Cr, Al, Ti, Ta, Mo, W, Ni, Cu, Au, Ag, etc, or alloys consisting of these elements as the principal component, or a conductor film having light transmissibility such as ITO, or their multi-layered film, by sputtering or vacuum deposition. Next, a gate wire 2, a gate electrode 3, a holding capacitance common wire 4, and a first wire 17 in a conversion portion are formed by photolithography and etching. Next, as shown in FIG. 2(b), a gate insulating film 5 made of silicon nitride is formed. A semiconductor film 6 made of amorphous Si, polycrystalline silicon (poly-Si), or the like, and a contact film 7 made of n+ amorphous Si doped with P in a high concentration, for example, in the case of an n type TFT, or n+ poly-Si, are continuously formed by plasma CVD, normal pressure CVD and vacuum CVD, for example. The contact film 7 and a semiconductor film 6 are then etched into an island shape.

Figure 2C:
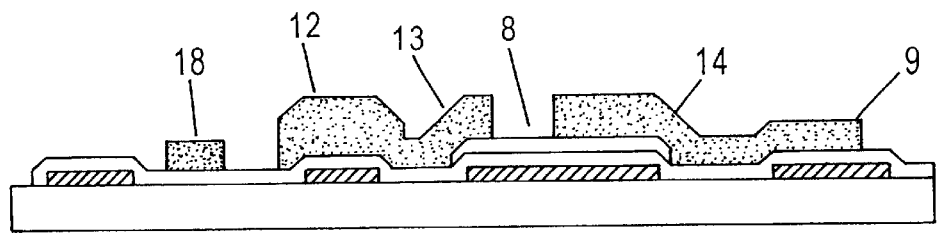
Figure 2D:
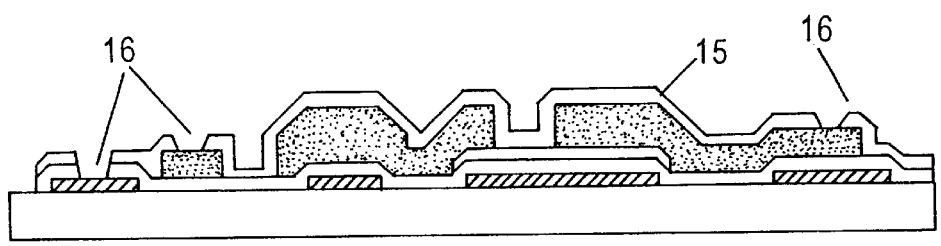
Figure 2E:
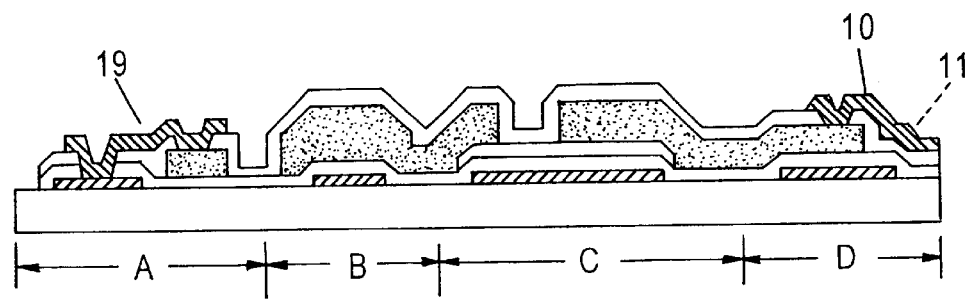

Next, a conductor film made of Cr, Al, Ti, Ta, Mo, W, Ni, Cu, Au, Ag or alloys consisting of these elements as the principal component, a conductor film having light transmissibility such as ITO, or their multi-layered film, is formed by sputtering or vacuum deposition. The conductor film is then processed by photolithography and photoetching to form a source wire 12, a source electrode 13, a drain electrode 14, a holding capacitance electrode 9 and a second wire 18, as shown in FIG. 2(c). The contact film 7 is etched away from a channel region with the source electrode 13 and the drain electrode 14 as the mask, or with a photo-resist having the source and drain electrodes 13 and 14 formed thereon, as the mask. An inter-layer insulation film 15 is formed from silicon nitride, silicon oxide, an inorganic insulating film or an organic resin as shown in FIG. 2(d). A contact hole 16 is then formed by photolithography and subsequent photoetching. Finally, a conductor film of Cr, Al, Ti, Ta, Mo, W, Ni, Cu, Au, Ag, or the like, alloys consisting of these elements as the principal components, a conductor film having light transmissibility such as ITO, or their multi-layered film, is formed and is then patterned to give a pixel electrode 10, a counter electrode 11 and a third wire 19 as shown in FIG. 2(e). At this time, bent portions 10a and 11a, that are bent in a direction opposite to the orientation direction D1 of the liquid crystal with respect to the source wire 12 orientation direction Ds, are provided to the distal end portions of both pixel electrode 10 and counter electrode 11 as shown in FIG. 1. The angle θe of these bent portions 10a and 11a may be within the range of 0°<θe<90° to obtain the intended effect. However, when this angle is so designed as to satisfy the relation 5°<θe<45°, the relation 0°<θe<90° can be kept even when the shape of the distal end of the electrode changes due to variance during the production, or short-circuit with the other electrode can be suppressed. In FIG. 1, symbol θ1 represents the angle between the orientation direction D1 of the liquid crystal molecules and the direction Ds of the source wire 12.

The process flow described above can produce a TFT substrate that constitutes the transverse direction electric field system liquid crystal display device of this embodiment. The liquid crystal is sandwiched between this TFT substrate and the opposed substrate, and the substrates are bonded to each other by a sealant. The liquid crystal molecules are oriented at this time at the angle θ1 by means such as rubbing, optical orientation, or the like. Incidentally, any known method may be used to orient the liquid crystal molecules. Furthermore, the gate wire 2, the source wire 12 and the holding capacitance common wire 4 are connected to a gate wire driving circuit, a source line driving circuit and a holding capacitance common wire power source, respectively, thereby completing the liquid crystal display device.

Figure 3:
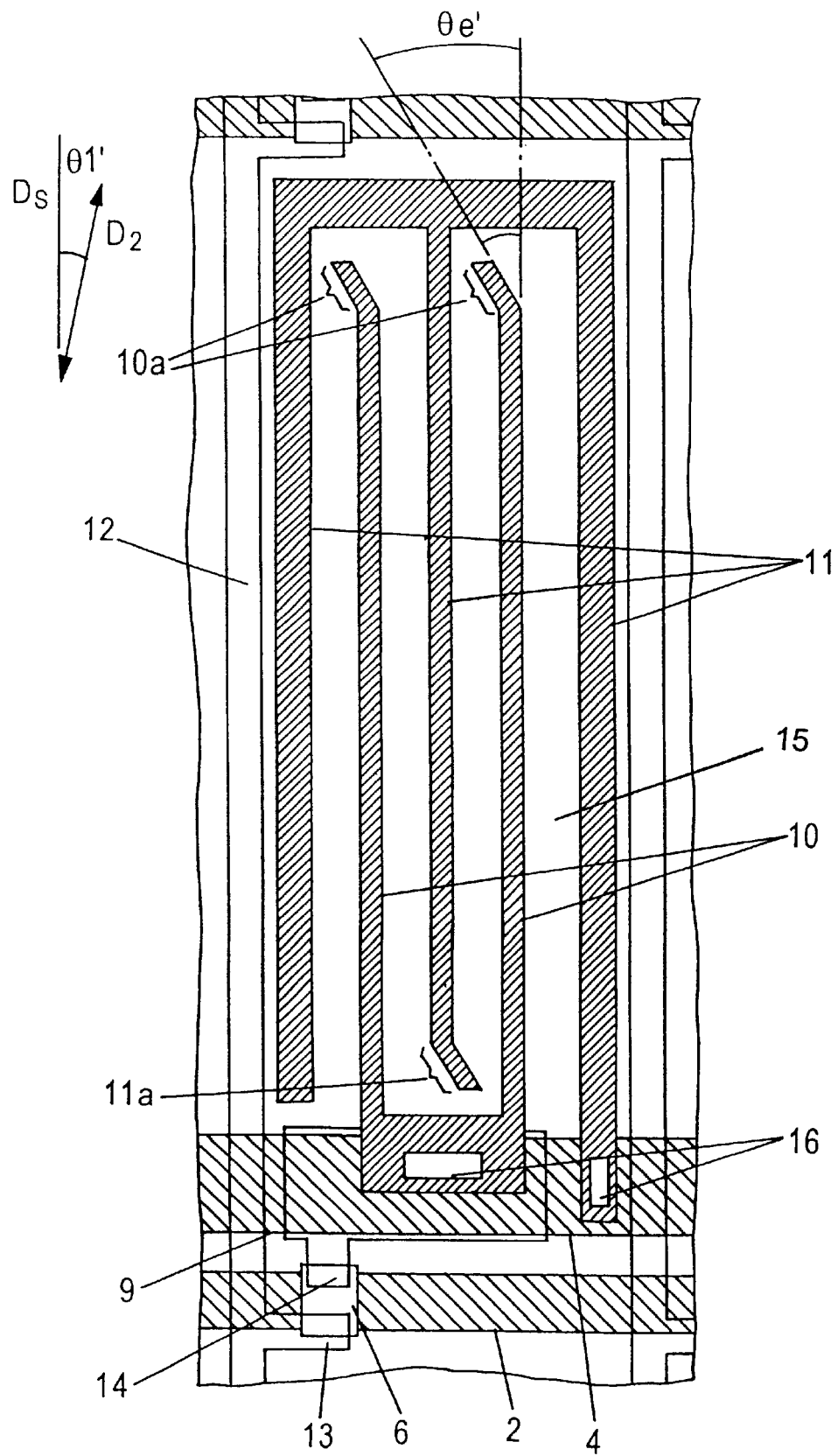
FIG. 3 is a plan view showing a pixel portion of another liquid crystal display device according to the first embodiment of the present invention.
Figure 4:
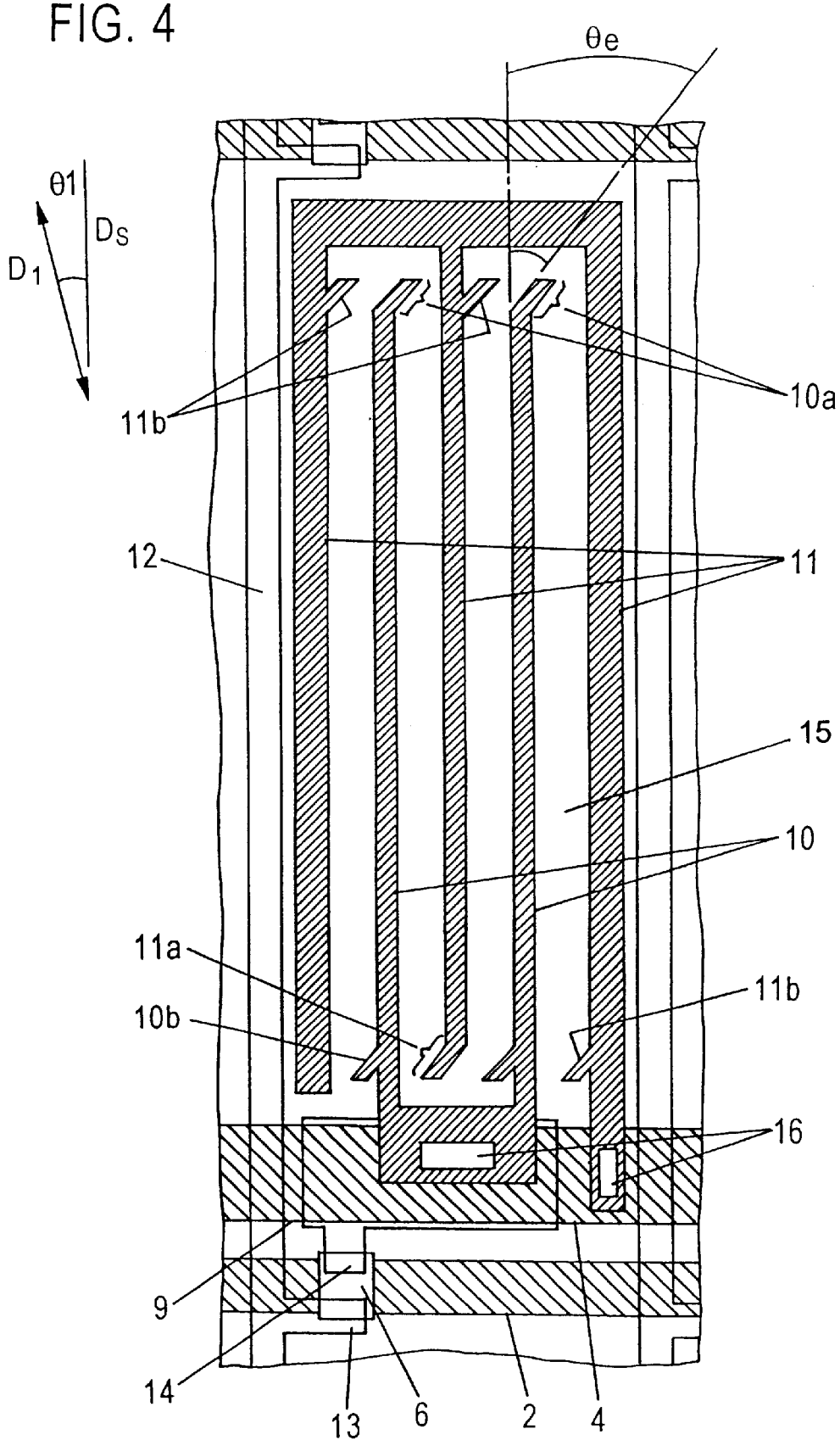
FIG. 4 is a plan view showing a pixel portion of still another liquid crystal display device according to the first embodiment of the present invention.

In this embodiment, the bent portions 10a and 11a that are bent in the direction opposite to the orientation direction of the liquid crystal relative to the source wire 12 are formed at the distal end portions of both pixel electrode 10 and counter electrode 11. For, extinction of the abnormal orientation region of the liquid crystal due to the weighting trace results from the bent portions, and the extinction time can be shortened much more rapidly when the bent portions are provided to the distal end portions of both pixel electrode 10 and counter electrode 11. On the other hand, the direction of the electric field is different in the bent portions from the direction of the electric field in the parallel portions and consequently, the transmission factor is likely to decrease at the time of full-white display. In such a case, the bent portion can be disposed at the distal end portion of either one of the pixel electrode 10 and the counter electrode 11. As shown in FIG. 3, when the angle θ1' between the direction Ds of the source wire 12 and the orientation direction D2 of the liquid crystal molecules becomes opposite to D1 shown in FIG. 1, the angle θe' of the bent portions 10a and 11a, too, may be in the opposite direction to θe and within the range of 1°<θe'<90°. Furthermore, a projection 11b, that protrudes in the same direction and at the same angle as the bent portion 10a may be disposed on the counter electrode 11 at a position adjacent to the bent portion 10a provided to the distal end of the pixel electrode 10, as shown in FIG. 4. Similarly, a projection 10b, that protrudes in the same direction and at the same angle as the bent portion 11a,may be provided to the pixel electrode 10 at a position adjacent to the bent portion 11a disposed at the distal end portion of the counter electrode 11.

According to this embodiment, the direction of the electric field at the distal end portions of both pixel electrode 10 and counter electrode 11 can be controlled to the direction to which the liquid crystal is to rotate. In consequence, the liquid crystal that is rotating in the opposite direction due to weighting can be rapidly returned to the normal rotating direction. Consequently, the defect called the "weighting trace", that is, the phenomenon in which the display defect due to weighting to the display surface is recognized for a long time even after this weighting is removed, can be rapidly decreased, and display quality can be improved. Since a protective sheet device for preventing weighting to the display surface becomes unnecessary, the production cost of the liquid crystal display device can be reduced. Incidentally, this embodiment represents the structure in which both pixel electrode 10 and counter electrode 11 are formed on the uppermost surface, respectively. However, this embodiment can obtain the similar effect even when an insulating film of SiN or $SiO_2$ is formed on both pixel electrode 10 and counter electrode 11, or when the pixel electrode 10 and the counter electrode 11 are disposed in separate layers through an insulating film.

Embodiment 2

Figure 5:
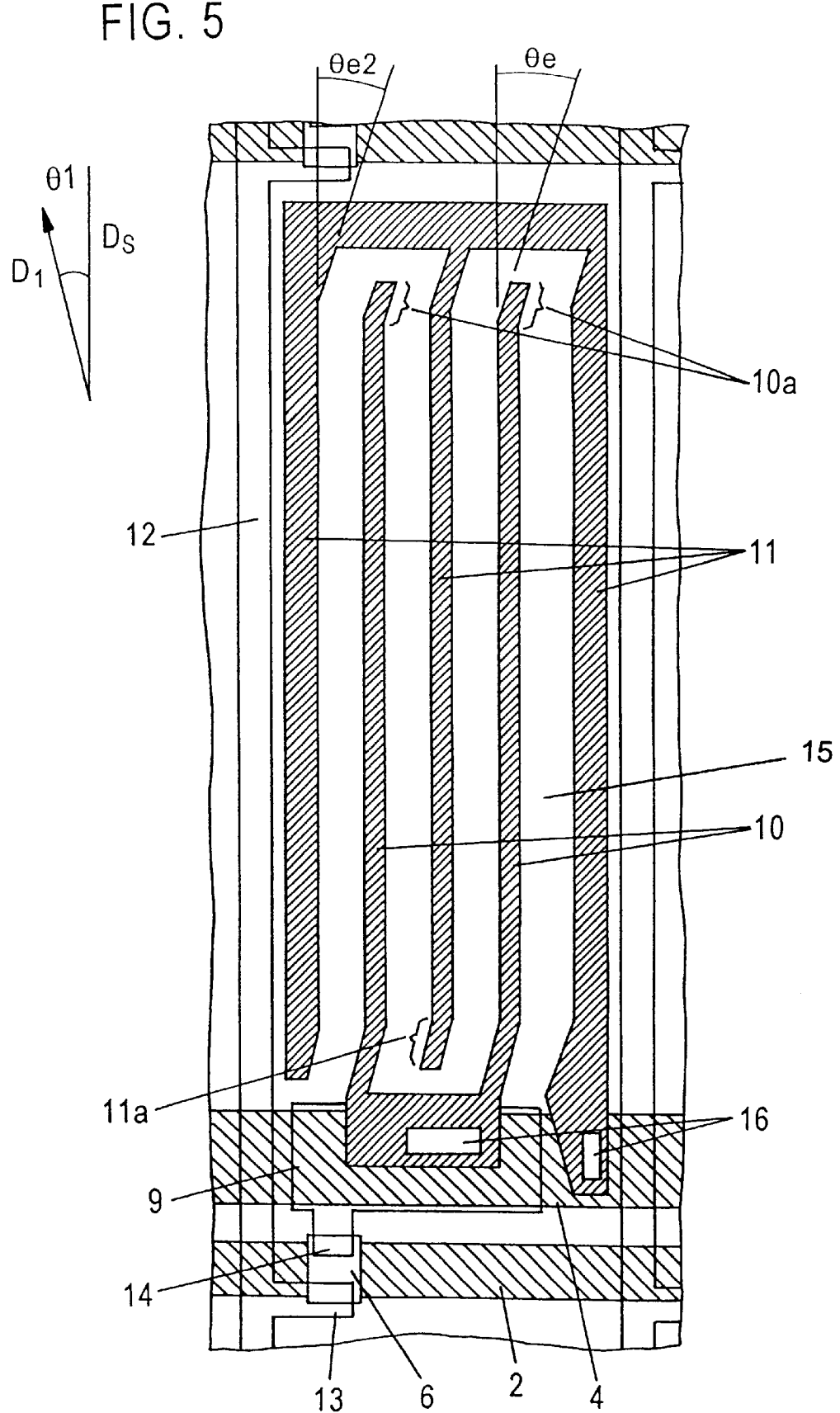
FIG. 5 is a plan view showing a pixel portion of a liquid crystal display device according to the second embodiment of the present invention.

FIG. 5 is a plan view showing a pixel portion of a liquid crystal display device according to the second embodiment of the present invention. Incidentally, like reference numerals are used to identify like constituent elements and the explanation of such members is omitted.

This embodiment forms the bent portions 10a and 11a bent in the direction opposite to the orientation direction D1 of the liquid crystal with respect to the source wire 12 orientation direction Ds at the distal end portions of both pixel electrode 10 and counter electrode 11 in the same way as in the first embodiment, and bends also the recess portions 10c and 11c of a plurality of comb-like electrodes of both pixel electrode 10 and counter electrode 11 in parallel with the bent portions 11a and 10a formed at the distal end portions of adjacent counter electrode 11 or pixel electrode 10. In other words, the angle θe2 of the recess falling within the range of 0°<θe2 <90° provides the effect in the same way as the angle θe of the bent portions 10a and 11a. However, when this angle θe2 is so designed as to satisfy the relation 5°<θe2<45°, the range 0°<θe2<90° can be maintained even when the distal end shape of each electrode changes due to production variance, and short-circuit with the other electrode can be suppressed. FIG. 5 shows the case where the bent portion 10a at the distal end of the pixel electrode 10, the recess portion of the counter electrode 11 opposing the bent portion 10a, the bent portion 11a at the distal end of the counter electrode 11 and the recess portion of the pixel electrode 10 opposing the bent portion 11a all satisfy the relations 1°<θe<90° and 1°<θe2<90°. In the drawing, θ1 represents the angle between the orientation direction D1 of the liquid crystal molecule and the source wire 12 orientation direction Ds. Incidentally, when the direction D1 of θ1 is opposite to the direction shown in FIG. 5 with respect to the direction Ds of the source wire 12, the directions of θe and θe2 may also be the opposite directions.

The rest of the constructions of the liquid crystal display device of this embodiment and its production method are the same as those of the first embodiment, and the explanation is therefore omitted. This embodiment, too, can improve display quality and can reduce the production cost in the same way as the first embodiment.

Embodiment 3

Figure 6:
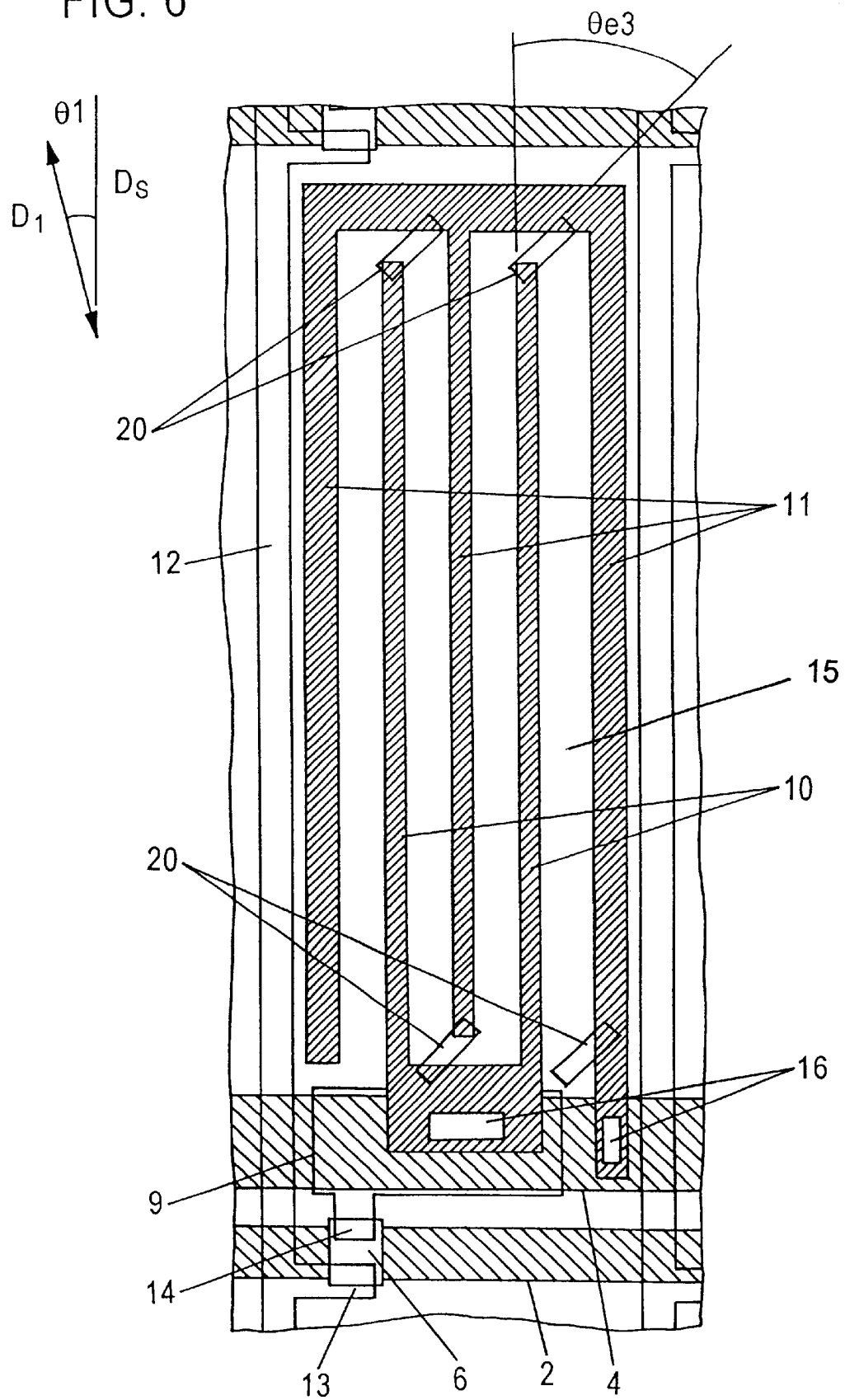
FIG. 6 is a plan view showing a pixel portion of a liquid crystal display device according to the third embodiment of the present invention.

FIG. 6 is a plan view showing a pixel portion of a liquid crystal display device according to the third embodiment of the present invention. In the drawing, reference numeral 20 denotes a conductor comprising a conductor film disposed at the distal end portion of each of the pixel electrode 10 and the counter electrode 11 through an insulating film. This conductor film is made of a metal such as Cr or a conductor film having light transmissibility such as ITO. In the drawing, like reference numerals are used to identify like constituent members, and the explanation of such members is omitted.

The process flow of the liquid crystal display device in this embodiment is the same as that of the first embodiment, and its explanation is omitted (see FIG. 2). However, the conductor 20 needs be disposed on the pixel electrode 10 and on the counter electrode 11 through the insulating film, and is therefore formed simultaneously with the gate wire 2 or with the source wire 12. When the gate wire 2 or the source wire 12 is made of a non-transparent material, the conductor 20 may be formed from a conductor film having light transmissibility such as ITO before, or after, the formation of the gate wire 2 or the source wire 12. In this case, the intended effect can be obtained when the angle $\theta e3$ between the conductor 20 and the pixel electrode 10 (or the counter electrode 11) is within the range of $0°<\theta e3<90°$. However, when this angle is so designed as to satisfy the relation $5°<\theta e3<45°$, the range $0°<\theta e3<90°$ can be maintained even when the distal end shape of the electrode changes due to production variance, or short-circuit with the other electrode can be suppressed.

Figure 7:
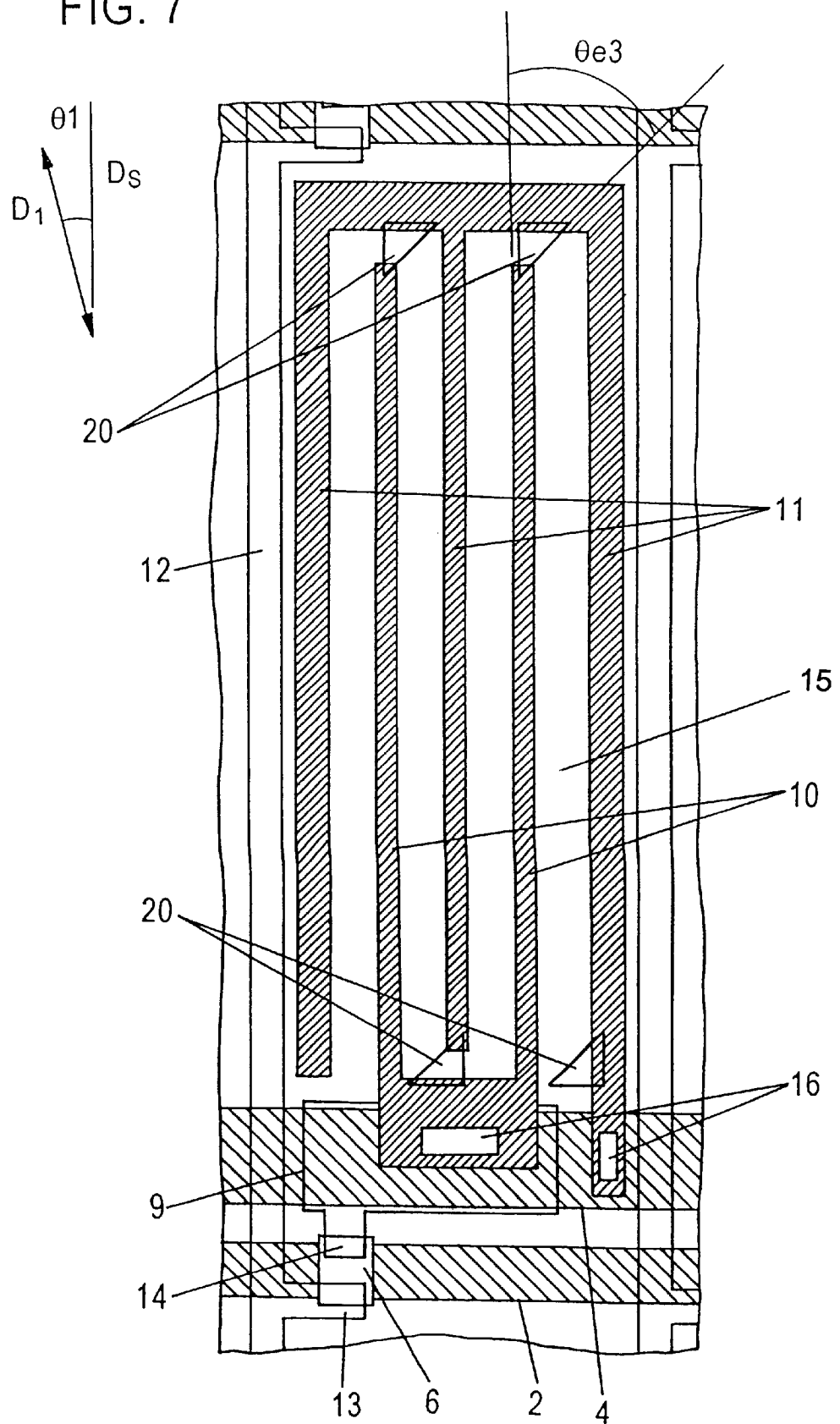
FIG. 7 is a plan view showing a pixel portion of another liquid crystal display device according to the third embodiment of the present invention.

The shape of the conductor 20 may be triangular as shown in FIG. 7. In other words, the conductor 20 may have a shape such that at least one of its sides inclines in the direction opposite to the orientation direction D1 of the liquid crystal with respect to the source wire 12 orientation direction Ds. When the orientation direction D1 of the liquid crystal is opposite to the direction shown in FIGS. 6 or 7 with respect to the direction Ds of the source wire 12, the direction of $\theta e3$, too, may be so set in the opposite direction as to satisfy the relation $1°<\theta e3<90°$. This embodiment, too, can improve display quality and can reduce the production cost in the same way as in the first and second embodiments. When the conductor 20 comprises a conductor film having light transmissibility such as ITO, the drop of the aperture ratio does not occur.

Embodiment 4

Figure 8:
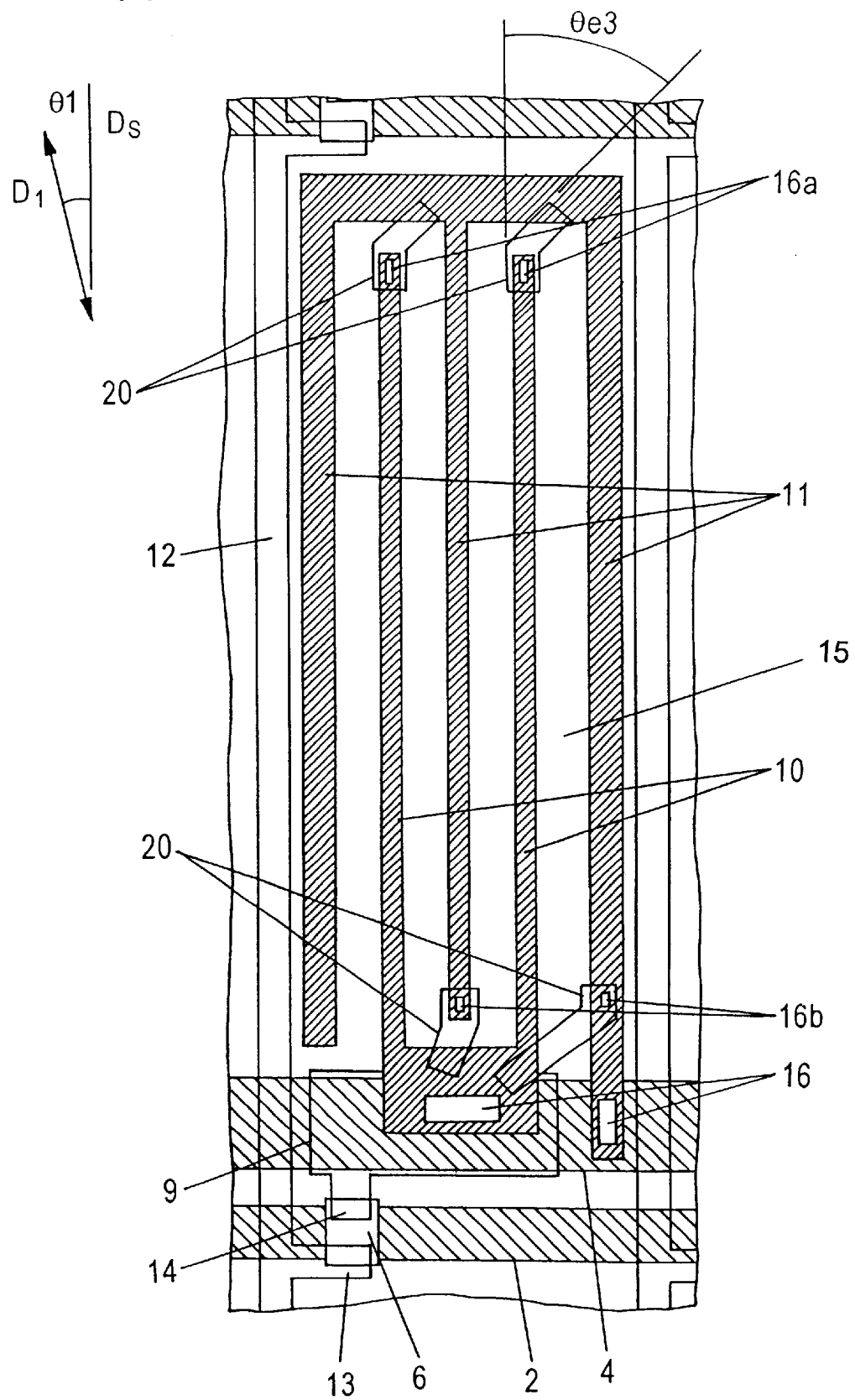
FIG. 8 is a plan view showing a pixel portion of a liquid crystal display device according to the fourth embodiment of the present invention.

FIG. 8 is a plan view showing a pixel portion of a liquid crystal display device according to the fourth embodiment of the present invention. In the drawing, reference numeral 16a denotes a contact hole for connecting electrically the conductor 20 provided to the distal end of the pixel electrode 10 to the pixel electrode 10. Reference numeral 16b denotes a contact hole for connecting electrically the conductor 20 provided to the distal end of the counter electrode 11 to the counter electrode 11. Like reference numerals are used in this drawing to identify like constituent members, and explanation of such members is omitted.

In this embodiment, the conductor 20 in the third embodiment is electrically connected to the distal end of the pixel electrode 10 and to the distal end of the counter electrode 11 through the contact holes 16a and 16b, respectively. The rest of the constructions and the process flow are the same as those of the third embodiment, and the explanation is therefore omitted.

This embodiment, too, can improve display quality and can reduce the production cost in the same way as the first to third embodiments. When the conductor 20 comprises a conductor film having light transmissibility such as ITO, the drop of the aperture ratio does not occur.

Embodiment 5

Figure 9:
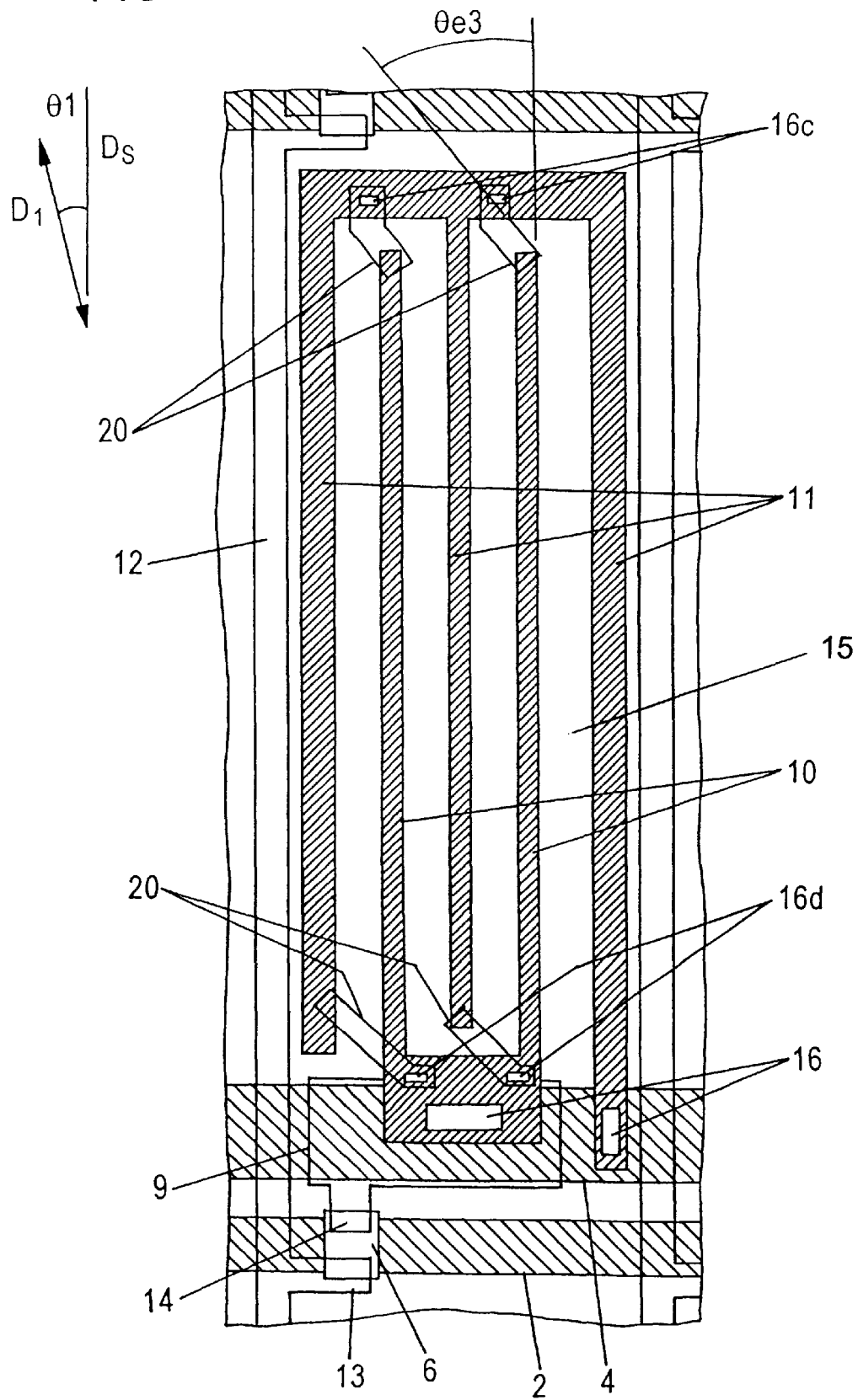
FIG. 9 is a plan view showing a pixel portion of a liquid crystal display device according to the fifth embodiment of the present invention.
Figure 10:
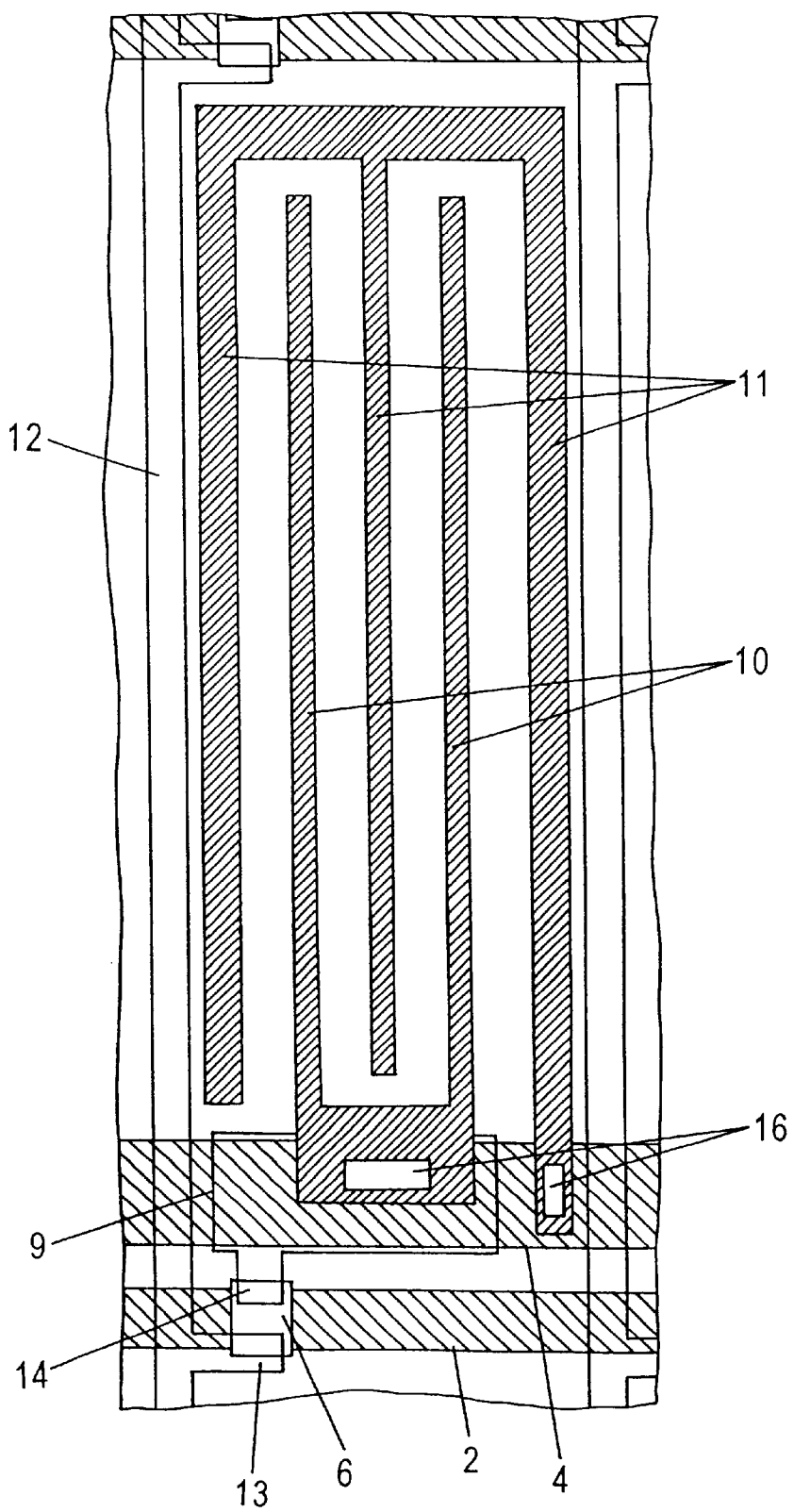
FIG. 10 is a plan view showing a pixel portion of a transverse direction electric field system liquid crystal display device according to the prior art.
Figure 11:
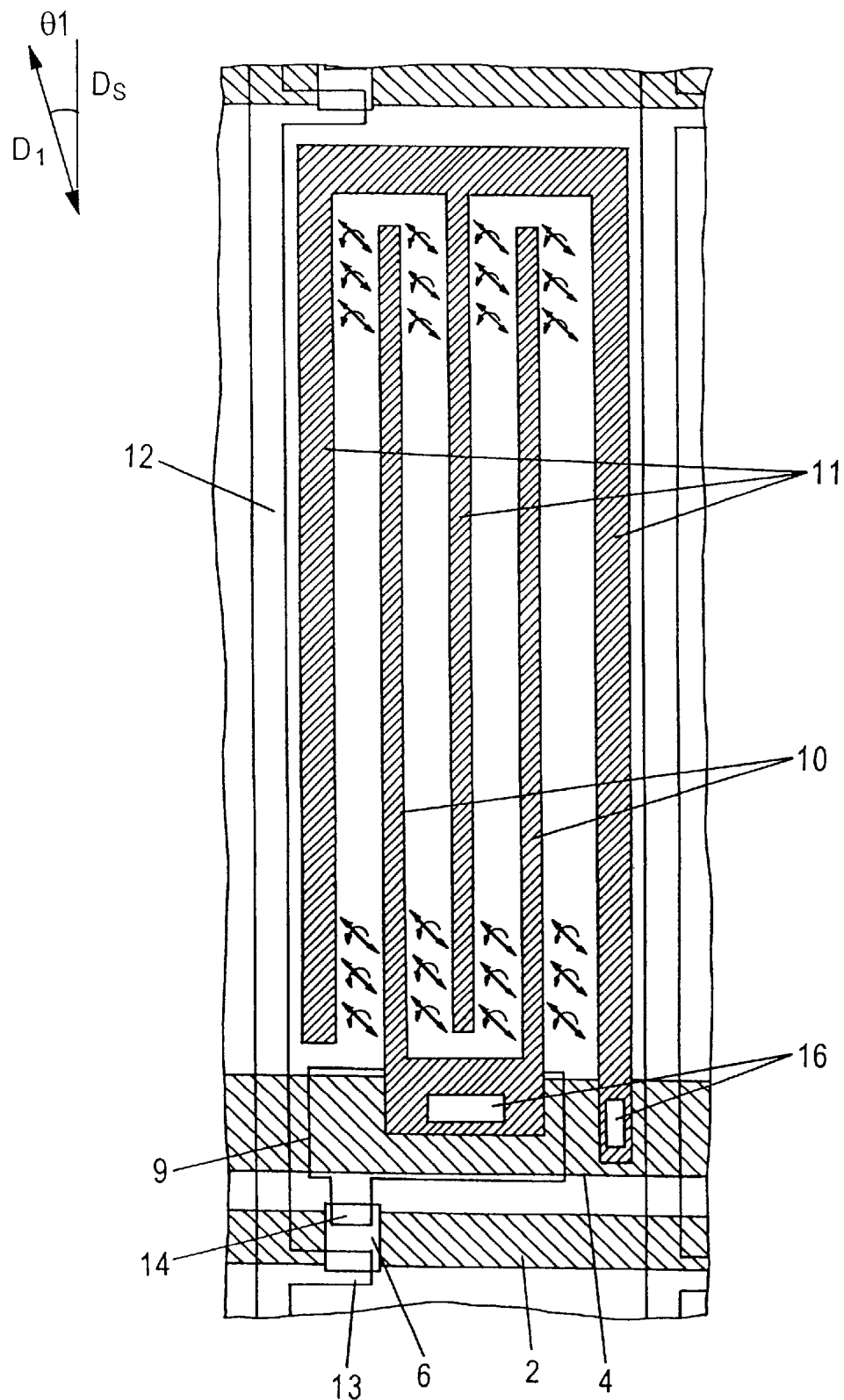
FIG. 11 is an explanatory view useful for explaining the principle of the occurrence of the weighting trace which is the problem of the liquid crystal display device according to the prior art.
Figure 12:
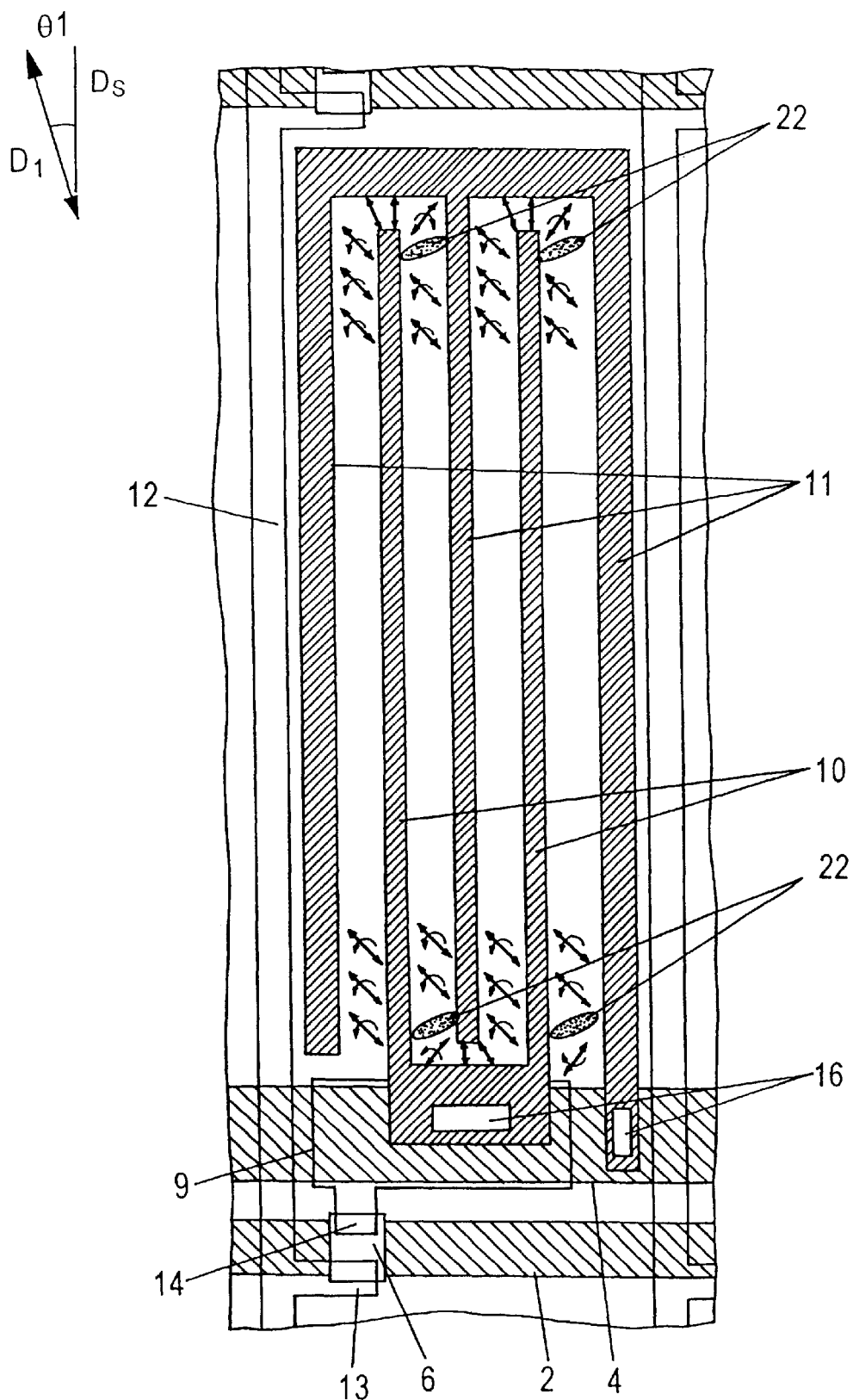
FIG. 12 is an explanatory view useful for explaining the principle of the occurrence of the weighting trace which is the problem of the liquid crystal display device according to the prior art.
Figure 13:
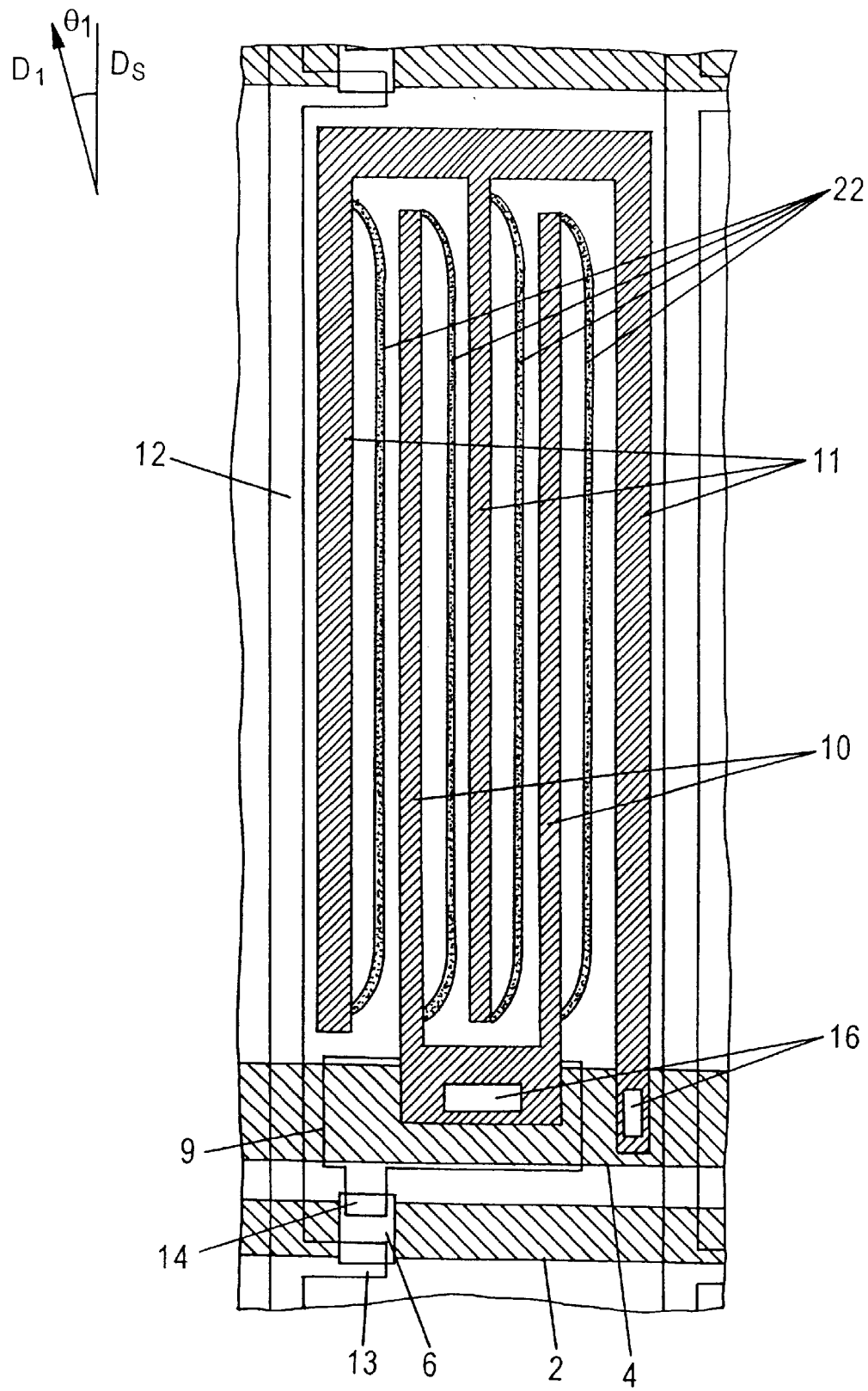
FIG. 13 is an explanatory view useful for explaining the principle of the occurrence of the weighting trace which is the problem of the liquid crystal display device according to the prior art.
Figure 14:
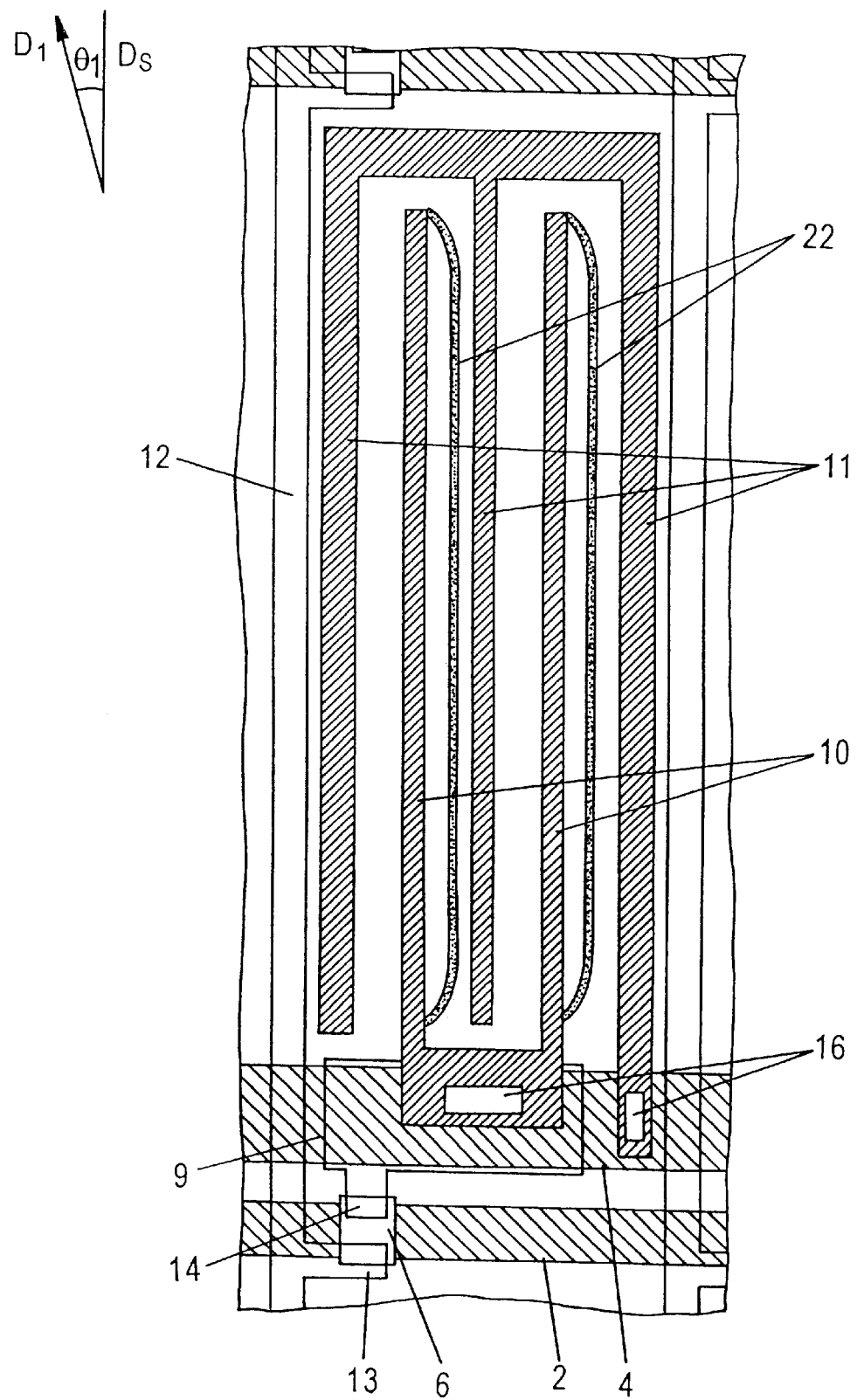
FIG. 14 is an explanatory view useful for explaining the principle of the occurrence of the weighting trace which is the problem of the liquid crystal display device according to the prior art.
Figure 15:
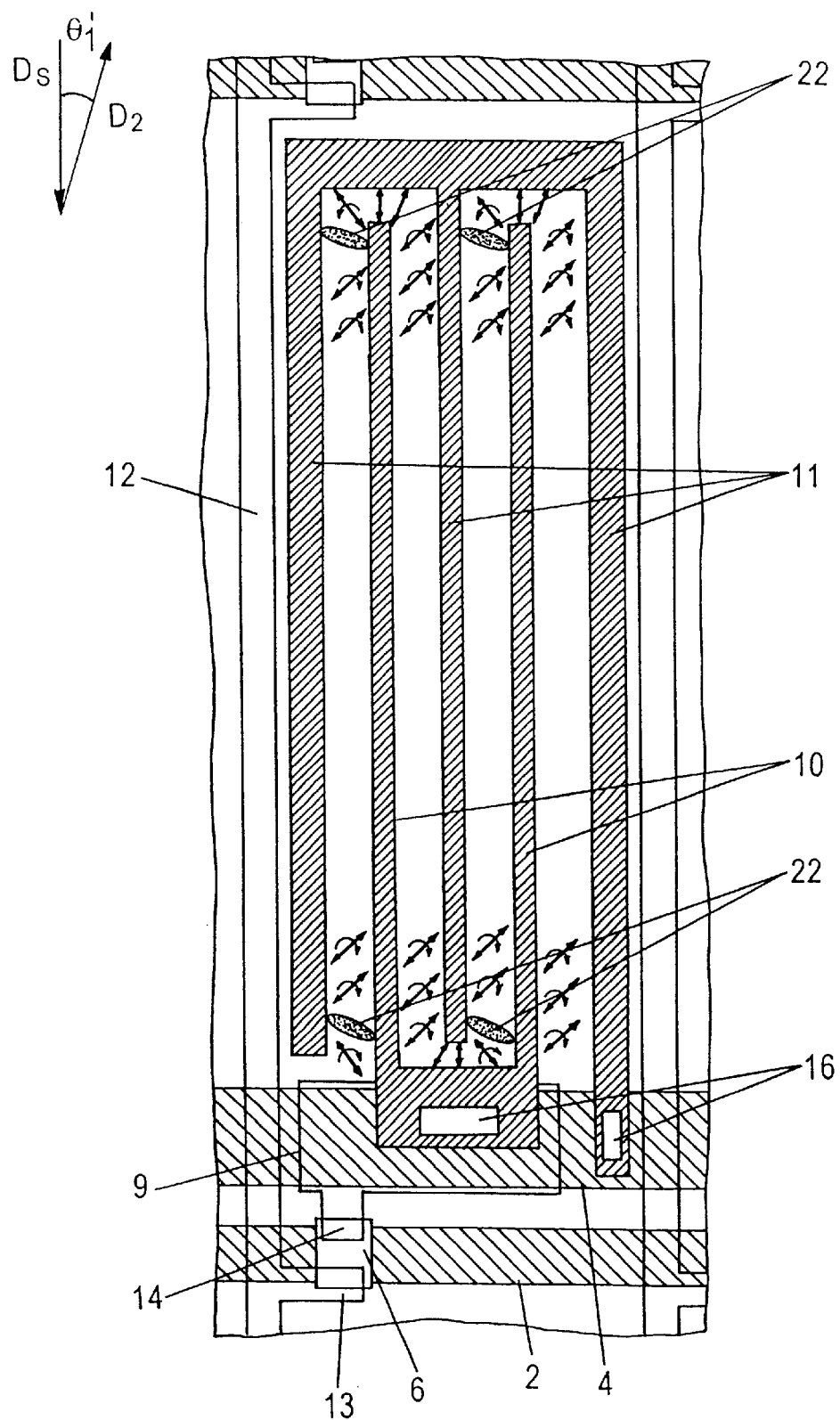
FIG. 15 is an explanatory view useful for explaining the principle of the occurrence of the weighting trace which is the problem of the liquid crystal display device according to the prior art.
Figure 16:
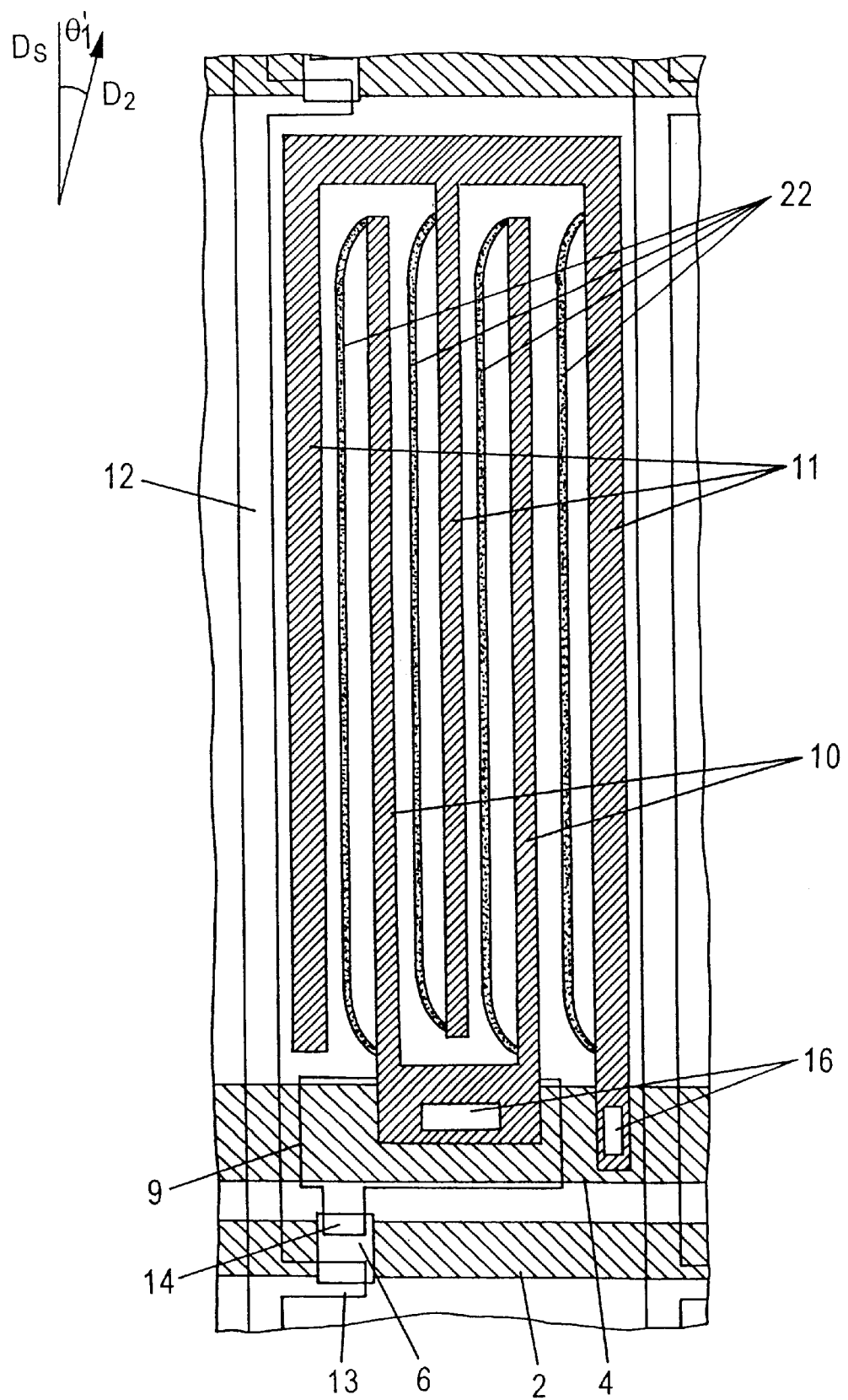
FIG. 16 is an explanatory view useful for explaining the principle of the occurrence of the weighting trace which is the problem of the liquid crystal display device according to the prior art.
Figure 17:
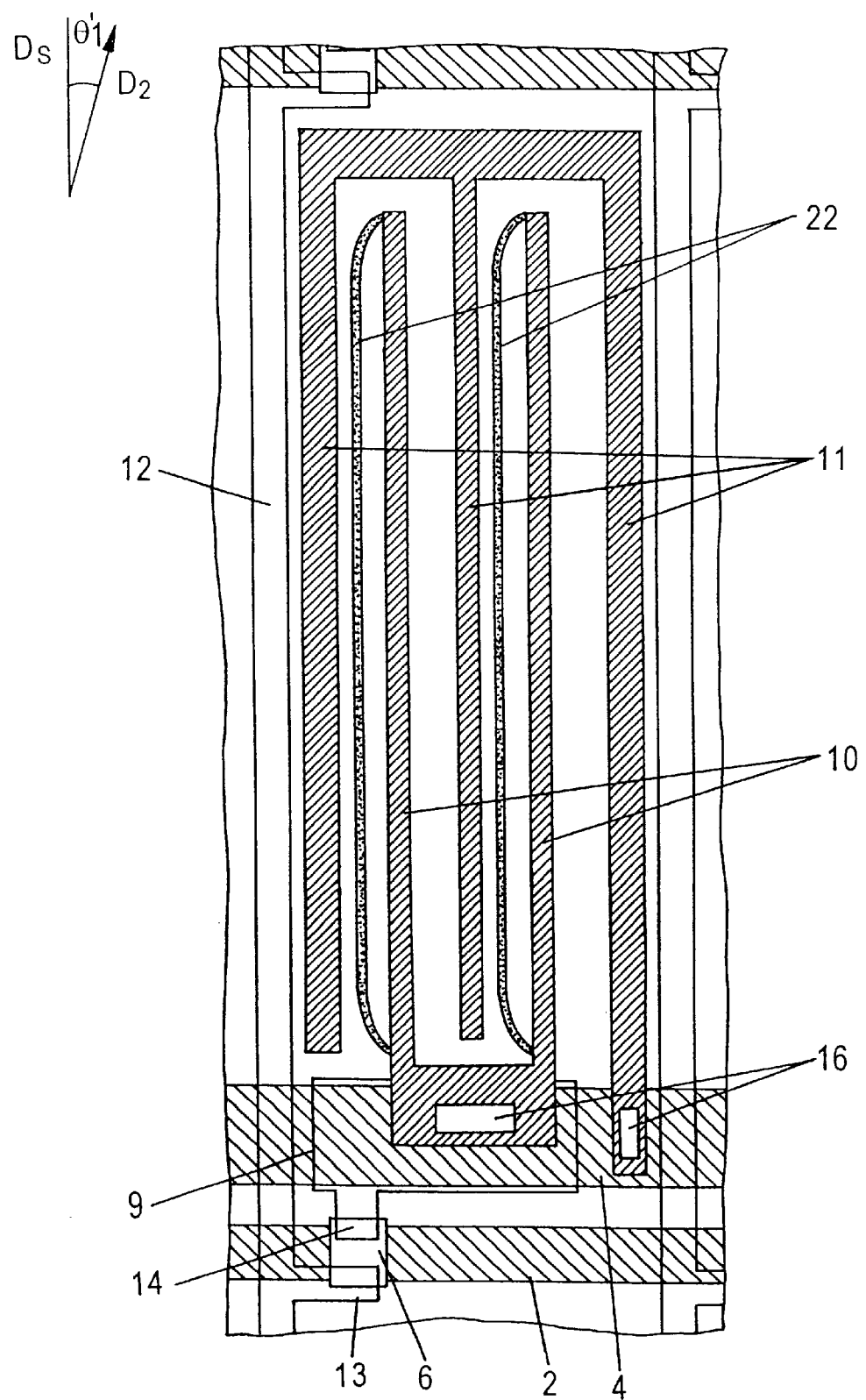
FIG. 17 is an explanatory view useful for explaining the principle of the occurrence of the weighting trace which is the problem of the liquid crystal display device according to the prior art.

FIG. 9 is a plan view showing a pixel portion of a liquid crystal display device according to the fifth embodiment of the present invention. In the drawing, reference numeral 16c denotes a contact hole for connecting electrically the conductor 20 formed in the recess portion of the counter electrode 11 to the counter electrode 11. Reference numeral 16d denotes a contact hole for connecting electrically the conductor 20 disposed in the recess portion of the pixel electrode 10 to the pixel electrode 10. Like reference numerals are used in this drawing to identify like constituent members and the explanation of such members is omitted.

In this embodiment, the conductor 20 in the third embodiment is electrically connected to the recess portions of both counter electrode 11 and pixel electrode 10 through the contact holes 16c and 16d, respectively. The rest of the constructions and the process flow are the same as those of the third embodiment, and the explanation is omitted.

This embodiment, too, can improve display quality and can reduce the production cost in the same way as in the first to fourth embodiments. The aperture ratio does not drop when the conductor 20 comprises a conductor film having light transmissibility such as ITO.

The first to fifth embodiments described above can acquire the similar effects described above irrespective of the TFT structure, the driving system, the size of the display, the number of pixels, the kind of the liquid crystal, etc, so long as the liquid crystal display device is of the transverse direction electric field system.

As described above, the present invention forms the bent portion, that is bent in the opposite direction to the orientation direction D1, D2 of the liquid crystal with respect to the video signal line orientation direction Ds, to the distal end portion of at least one of the pixel electrode and the counter electrode. Therefore, the present invention can control the direction of the electric field at the distal end portion of the pixel electrode or the counter electrode to the direction in which the liquid crystal is to rotate, and can quickly return the liquid crystal, that is rotating in the reverse rotating direction due to weighting, to the normal rotating direction. Therefore, the present invention can quickly reduce the defect called "weighting trace" that develops when any load is applied to the display surface and can be recognized for a long time event after the removal of the load, and can improve display quality. Furthermore, since the protective sheet device for preventing weighting to the display surface becomes unnecessary, the present invention can reduce the production cost of the liquid crystal display device.

What is claimed is:

1. A liquid crystal display device including:
    a pair of substrates so disposed in the spaced-apart relation as to oppose each other with a predetermined distance between them;
    a liquid crystal layer sandwiched between said substrates;
    a plurality of scanning signal lines and a plurality of video signal lines so formed on one of said substrates as to cross one another;
    thin film transistors each being disposed at the point of intersection between said scanning signal line and said video signal line;
    a comb-like pixel electrode comprising a plurality of electrodes each connected to said thin film transistor and disposed in parallel with said video signal line; and
    a comb-like counter electrode comprising a plurality of electrodes disposed alternately and in parallel with a plurality of electrodes of said pixel electrode;
    said liquid crystal display device applying a voltage between said pixel electrode and said counter electrode to thereby apply an electric field substantially in parallel with the substrate surface to said liquid crystal layer, wherein:
    a bent portion bent in a direction opposite to an orientation direction of said liquid crystal with respect to said video signal line is disposed at the distal end portion of at least one of said pixel electrode and said counter electrode.

2. A liquid crystal display device according to claim 1, wherein said bent portion is disposed at the distal end portion of said comb-like pixel electrode.

3. A liquid crystal display device according to claim 2, wherein said counter electrode has a projection portion protruding at the same angle and in the same direction as said bent portion and disposed at a position thereof adjacent to said bent portion disposed at the distal end portion of said pixel electrode.

4. A liquid crystal display device according to claim 2, wherein each of recess portions of a plurality of comb-like electrodes of said counter electrode is bent in parallel with said bent portion formed at the distal end portion of said pixel electrode adjacent thereto.

5. A liquid crystal display device according to claim 1, wherein said bent portion is disposed at the distal end portion of said comb-like counter electrode.

6. A liquid crystal display device according to claim 5, wherein said pixel electrode has a projection portion protruding at the same angle and in the same direction as said bent portion at a position thereof adjacent to said bent portion disposed at the distal end portion of said counter electrode.

7. A liquid crystal display device according to claim 5, further comprising: bent recess portions of a plurality of said comb-like pixel electrodes each being bent in parallel with said bent portion disposed at the distal end portion of said counter electrode adjacent thereto.

8. A liquid crystal display device including:
    a pair of substrates so disposed in the spaced-apart relation as to oppose each other with a predetermined distance between them;
    a liquid crystal layer sandwiched between said substrates;
    a plurality of scanning signal lines and a plurality of video signal lines so formed on one of said substrates as to cross one another;
    thin film transistors each being disposed at the point of intersection between said scanning signal line and said video signal line;
    a comb-like pixel electrode comprising a plurality of electrodes connected to said thin film transistors and disposed in parallel with said video signal line;
    a comb-like counter electrode comprising a plurality of electrodes disposed alternately and in parallel with a plurality of electrodes of said pixel electrode;
    said liquid crystal display device applying a voltage between said pixel electrode and said counter electrode and applying an electric field substantially in parallel with the substrate surface to said liquid crystal layer, wherein:
    a plurality of conductors having a pattern shape such that at least one of the sides thereof is inclined in a direction opposite to an orientation direction of said liquid crystal with respect to said video signal line, each of which is disposed at a distal end portion of at least one of said pixel electrode and said counter electrode, through an insulating film.

9. A liquid crystal display device according to claim 8, wherein each of said plurality of conductors is electrically connected to said pixel electrode or to said counter electrode through a contact hole.

10. A liquid crystal display device according to claim 8, wherein each of said plurality of conductors comprises a conductor film having light transmissibility.

11. A liquid crystal display device including:
    a pair of substrates disposed to each other;
    a liquid crystal layer sandwiched between said substrates;
    a plurality of scanning lines and a plurality of video signal lines formed on one of said substrates as to cross one another;
    thin film transistors each being disposed at the position corresponding to the cross point of intersection between each of said plurality of scanning lines and said plurality of video signal lines;
    a pixel electrode having a plurality of electrodes connected to each of said thin film transistors, at least one of the plurality of electrodes of said pixel electrode has a root portion and a distal end portion positioned at the remote side from each of said thin film transistor, said distal end portion is provided with a bent portion bent from its root portion;
    a counter electrode having a plurality of electrodes, at least one of the plurality of electrodes of said counter electrode has a root portion elongated along with the root portion of said pixel electrode and a distal end portion positioned at near side from said thin film transistor, said distal end portion is provided with a bent portion;
    said liquid crystal display device applying a voltage between said pixel electrode and said counter electrode to thereby apply an electric field substantially in parallel with the substrate surface to said liquid crystal layer,
    wherein each of said bent portions of said pixel electrode and said counter electrode is positioned in a direction opposite to the orientation direction of the liquid crystal in said liquid crystal layer with respect to the elongated line of its root portion.

12. The liquid crystal display device claim in claim 11, said counter electrode has a bent surface substantially parallel with the bent surface of said bent portion of said pixel electrode and said pixel electrode has a bent surface substantially parallel with the bent surface of said bent portion of said counter electrode.

13. The liquid crystal display device claimed in claim 12, the angle between said elongated line of said root portion of said pixel electrode and its bent portion and the angle between said elongated line of said root portion of said counter electrode and its bent portion are both greater than 0° and smaller than 90°.

14. The liquid crystal display device claimed in claim 12, the angle between said elongated line of said root portion of said pixel electrode and its bent portion and the angle between said elongated line of said root portion of said counter electrode and its bent portion are both greater than 5° and smaller than 45°.

15. The liquid crystal display device claimed in claim 11, the angle between said elongated line of said root portion of said pixel electrode and its bent portion and the angle between said elongated line of said root portion of said counter electrode and its bent portion are both greater than 0° and smaller than 90°.

16. The liquid crystal display device claimed in claim 11, the angle between said elongated line of said root portion of said pixel electrode and its bent portion and the angle between said elongated line of said root portion of said counter electrode and its bent portion are both greater than 5° and smaller than 45°.

\* \* \* \* \*